Sept. 8, 1964 J. I. TARSEY 3,148,013
PARKING METER CONTROL UNIT
Filed April 16, 1962 6 Sheets-Sheet 1

INVENTOR.
JASON I. TARSEY
BY MAHONEY, MILLER & RAMBO
BY Wm. V. Miller
ATTORNEYS

Sept. 8, 1964 J. I. TARSEY 3,148,013
PARKING METER CONTROL UNIT
Filed April 16, 1962 6 Sheets-Sheet 3

INVENTOR.
JASON I. TARSEY
BY
MAHONEY, MILLER & RAMBO
BY *Wm. V. Miller*
ATTORNEYS

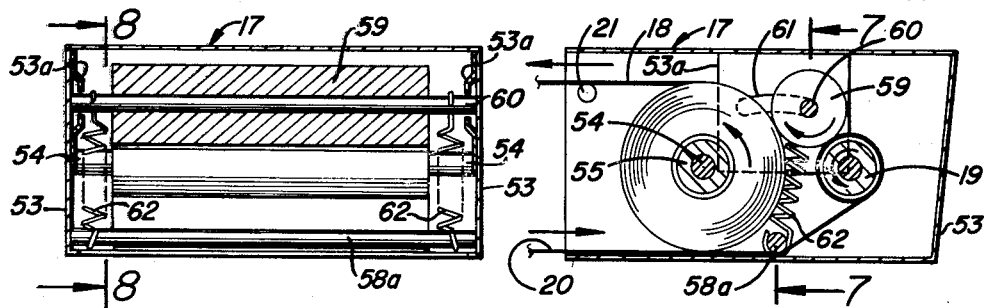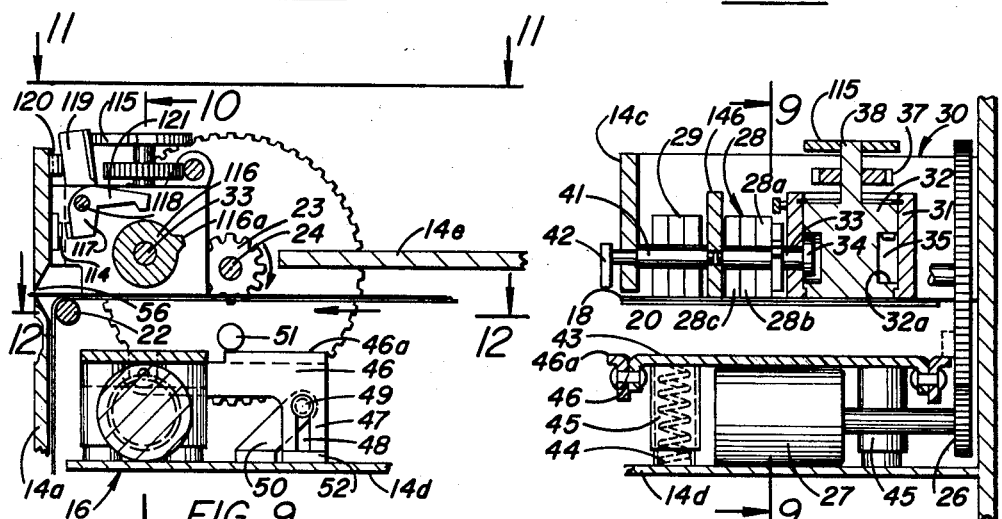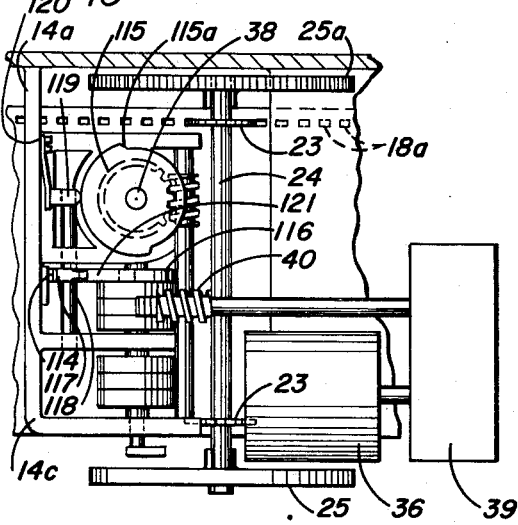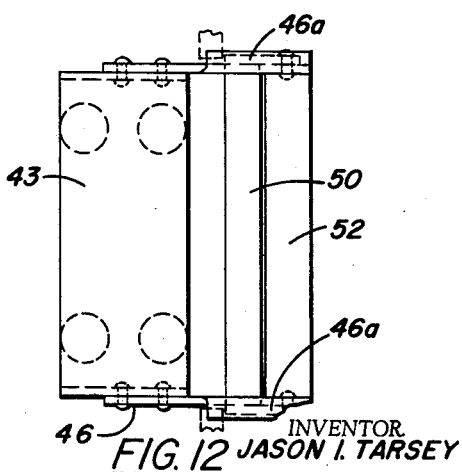

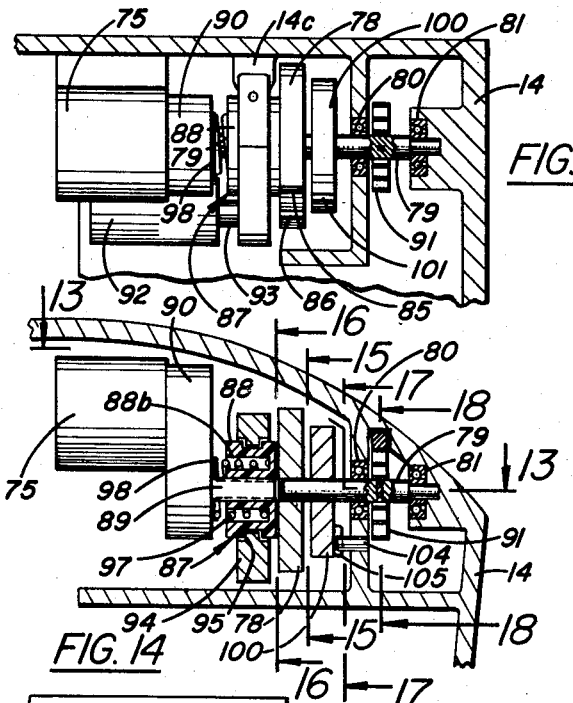
FIG. 13
FIG. 14
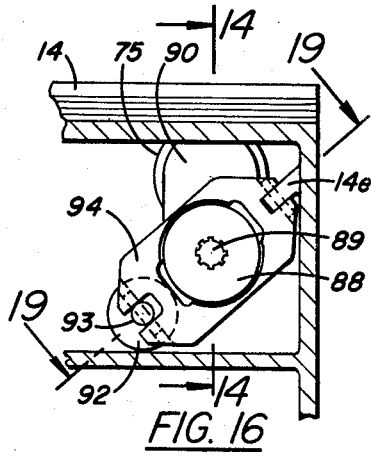
FIG. 16
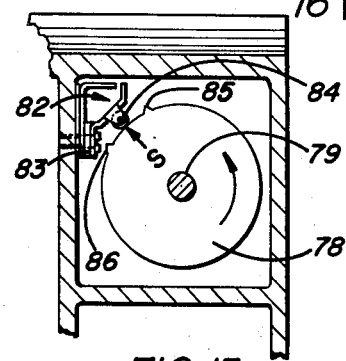
FIG. 15
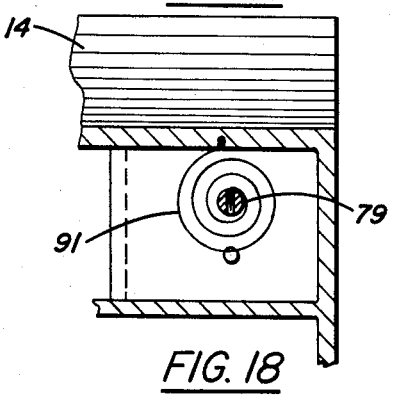
FIG. 18
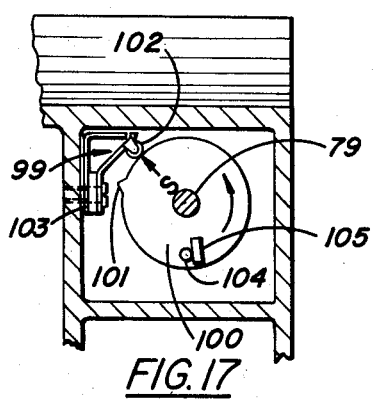
FIG. 17
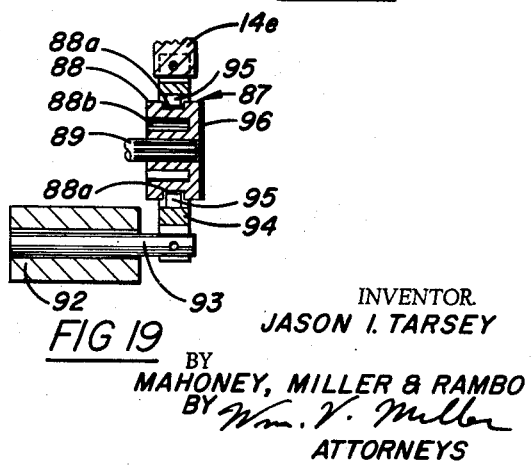
FIG 19
INVENTOR.
JASON I. TARSEY
BY MAHONEY, MILLER & RAMBO
BY Wm. V. Miller
ATTORNEYS Sept. 8, 1964

J. I. TARSEY 3,148,013

PARKING METER CONTROL UNIT

Filed April 16, 1962

INVENTOR.
JASON I. TARSEY

BY
MAHONEY, MILLER & RAMBO
BY
ATTORNEYS

United States Patent Office 3,148,013
Patented Sept. 8, 1964

3,148,013
PARKING METER CONTROL UNIT
Jason I. Tarsey, 1935 Hau St., Honolulu 17, Hawaii
Filed Apr. 16, 1962, Ser. No. 187,721
12 Claims. (Cl. 346—20)

This invention relates in general to coin-actuated parking meters. It relates, more specifically, to an electrically operated control for a coin-actuated parking meter mechanism, that automatically determines overtime or unpaid parking violations and issues a ticket or tickets therefor.

Policing or monitoring of the multitude of parking meters that are currently in use in substantially all of the urban areas where vehicular traffic is heavy is a necessary but monumental task to provide adequate parking space as well as maintain an orderly flow of traffic. Monitoring of such metered parking areas is also necessary for the protection of the revenues obtained thereby. Parking meters have primarily been utilized by municipalities although they are utilized by some privately operated parking lots. Theretofore, the monitoring has required the services of many employees or, in the case of municipalities, policemen to assure that vehicles are not parked for periods of time in excess of the paid parking interval as the previously devised parking meters have generally been of the type which only indicate whether payment has been made for the parked car. This requires not only the employment of additional personnel which represents an additional operating expense but materially reduces the time which a policeman may appropriate for other law-enforcement duties. Considering the practical conditions of municipal parking regulation enforcement, it is an impossibility to assign sufficient personnel to adequately monitor all of the metered parking areas continuously. Therefore, a considerable amount of revenue has generally been lost by municipalities as a consequence of the previous monitoring practices.

The major objective of this invention is to provide a control unit for a coin-actuated parking meter mechanism which performs substantially all of the functions of an attendant in the monitoring of any particular parking space associated therewith. The control simultaneously monitors the presence of a vehicle in the associated parking space and measures the time interval for which the vehicle remains parked if no payment is made therefor. In conjunction with the measurement of unpaid parking intervals, the control automatically issues a ticket, or tickets, for overtime or unpaid parking and provides a record of each ticket issued and accurately identifies the offending vehicle.

It is also an object to provide a control that is electrically operated and utilizes components which may be conveniently and economically powered by batteries furnished therewith providing a self-contained control. It is contemplated that the control may be furnished as an attachment for the coin-actuated parking meter mechanism currently in use or as a complete unit incorporating the necessary coin-actuated mechanism. As an attachment for an existing meter, the operation of the control only requires that three electrical switches be mechanically connected to the coin-actuated meter provided with a reset device, in cooperative relationship with the time indicator or needle thereof.

A master time clock is included in the control which continuously operates a time indicator and an electrical power switch. The time indicator is provided with a plurality of printing dials or wheels having type numerals positioned thereon for stamping a ticket with an identification of the date and time of the violation. Simultaneously, a record of the ticket and a photograph of the vehicle license plate is obtained for the subsequent enforcement of all unpaid violations.

Other objects and advantages of this invention will be readily apparent from the following detailed description of an embodiment thereof and the accompanying illustrative drawings.

In the drawings:

FIG. 7 is a vertical sectional detail of the ticket magazine taken along line 7—7 of FIG. 8;

FIG. 8 is a vertical sectional detail of the ticket magazine taken along line 8—8 of FIG. 7;

FIG. 9 is a vertical sectional detail of the ticket printer mechanism taken along line 9—9 of FIG. 10;

FIG. 10 is a vertical sectional detail of the ticket printer mechanism taken along line 10—10 of FIG. 9;

FIG. 11 is a top plan view of the ticket printer mechanism;

FIG. 12 is a top plan view of the stamping plate taken along line 12—12 of FIG. 9;

FIG. 13 is a plan view of the timer mechanism, partially in section, taken along line 13—13 of FIG. 14;

FIG. 14 is an elevational view of the timer mechanism, partially in section, taken along line 14—14 of FIG. 16;

FIG. 15 is an end elevational view of the timer cam taken along line 15—15 of FIG. 14;

FIG. 16 is an end elevational view of the clutch mechanism taken along line 16—16 of FIG. 14;

FIG. 17 is an end elevational view of the reset cam taken along line 17—17 of FIG. 14;

FIG. 18 is an end elevational view of the timer reset spring taken along line 18—18 of FIG. 14;

FIG. 19 is a sectional detail of the clutch mechanism taken along line 19—19 of FIG. 16.

Figure 1:
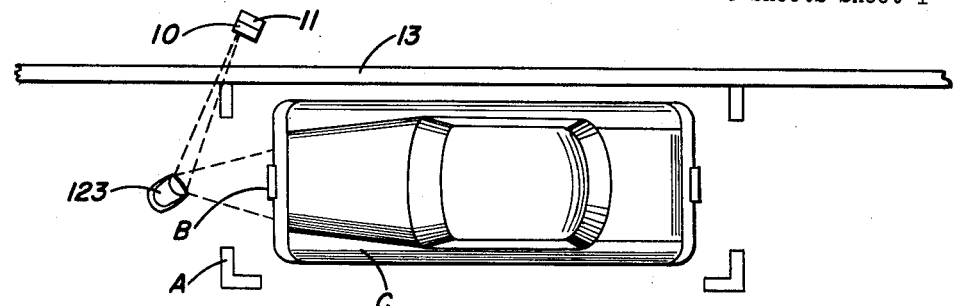
FIG. 1 is a plan view of a meter parking space having a vehicle parked therein with an embodiment of the control unit mounted adjacent thereto.
Figure 2:
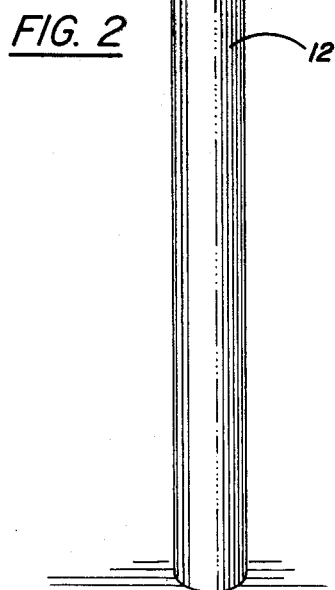
FIG. 2 is a perspective view of an embodiment of the control unit attached to a meter timer mechanism.

Referring now to the drawings, an embodiment of a control unit 10 is shown in FIG. 2 attached to a coin-actuated parking meter 11. The parking meter 11 is mounted on a tubular standard 12 and supports the control unit at an appropriate elevation relative to the pavement. As is the usual practice, the meter is positioned adjacent a curb 13 near one end of a parking space A marked on the pavement as illustrated in FIG. 1. The control unit 10 described herein and illustrated by the drawings is particularly adapted for attachment to a parking meter 11 provided with a reset device. The parking meter 11 may be of any standard form such as those that have been previously devised and is, therefore, not described in detail. As is well known, a parking meter of standard form includes a timer mechanism which is manually set to determine a parking interval that may be purchased through deposit of the necessary coins in the meter. As shown in FIG. 2, the control unit 10 includes a housing 14 secured to the parking meter 11 and provided with a cover 15 removably mounted on one side by a locking device 15a. The particular form of the housing may be varied to fit the associated parking meter 11. In the present embodiment, the housing is of a generally rectangular form, and is preferably fabricated from a metal which may be cast to provide several interior compartments for supporting the several components of the unit. The several components include a ticket magazine, printing mechanism, master time clock and time controlled power switch, a control unit timing mechanism, a timing mechanism reset mechanism, a detector unit, and a photographic camera. The arrangement of the several components in the housing is illustrated best by FIGS. 5 and 6.

The printing mechanism is denoted generally by the numeral 16 and is shown in detail by FIGS. 9–12. The function of the printing mechanism is to feed a continuous web of ticket forms through a printer and print the information necessary to determine the particular violation incurred by a vehicle parked in the assigned parking place. Associated with the printing mechanism is a ticket magazine 17 illustrated in detail by FIGS. 7 and 8. The ticket magazine supports a supply roll of the ticket forms 18 and has a take-up spool 19 for rewinding a continuous web record tape 20. The ticket form web 18 is supported for travel in a horizontal plane through the printing mechanism by a pair of spaced rollers 21 and 22. Roller 21 is rotatably supported by the ticket magazine at one side of the printing mechanism and roller 22 is rotatably supported by the housing 14 at the opposite side of the printing mechanism. The continuous web record tape 20, which is also wound on the roll with the ticket forms 18 moves through the printing mechanism with the ticket forms. Driving of the ticket forms 18 and record tape 20 is accomplished by a pair of spaced sprocket wheels 23 mounted on a shaft 24 supported for rotation above the ticket web. The teeth of the sprocket wheels 23 engage a series of spaced perforations 18a formed in the marginal edges of the ticket forms 18 and record tape 20 to assure positive motion. The shaft 24 also has gears 25 and 25a fixed to each end thereof (see FIG. 11). The gear 25a meshes with a pinion gear 26 fixed on the shift of a servo motor 27. The motor 27 is mounted on a plate 14d secured to the housing 14. Applying power to the servo motor 27 will, therefore, cause the associated ticket forms and record web to move through the printing mechanism 16.

The printing mechanism 16 includes a master time clock comprising a plurality of relatively movable printing wheels 28 and 29 and an hour printing dial 30. The hour dial 30 comprises a cylindrical housing 31 supported by an integrally formed bracket of U-form attached to a wall member 14a of the housing. Rotatably mounted within the cylindrical housing 31 is a cylinder 32 having a raised arrow (not shown) formed on the lower end thereof. On the lower end of the cylindrical housing 31 are raised numerals for denoting the twenty-four hour periods in a day. Rotation of the cylinder 32 will, therefore, cause the arrow to point to an appropriate numeral. The printing wheels 28 are mounted on a rotatable shaft 33 having one end journalled in a bracket 14b secured to the wall member 14a. The other end of the shaft 33 is journalled in the side of the housing 31 and extends a distance inwardly thereof with a gear 34 mounted thereon interiorly of the housing. The cylinder 32 has an annular recess 32a formed therein to accommodate the gear 34. Rotary motion of the cylinder 32 is transmitted to the gear 34 by means of a gear tooth 35 fixed to the side of the annular recess. As the hour dial cylinder 32 makes one complete revolution corresponding to twenty-four hours, the tooth 35 will engage the gear 34 to rotate the shaft 33 a proportionate angular distance. Printing wheel 28 includes three relatively movable sections 28a, 28b and 28c of disc form and wheel 28a, which is fixed to the shaft 33, will thereby be rotated. Formed on the surface of the wheel 28a are uniformly spaced, raised numerals 1 through 7 which correspond to the days of the week and appropriate selection of the gear ratio for gears 34 and 35 will cause wheel 28a to rotate one-seventh of a revolution for each complete revolution of the time cylinder 32. Wheels 28b and 28c are rotatably mounted on the shaft 33 and have uniformly spaced, raised numerals 1 through 10 formed on the periphery thereof. Motion of the wheel 28a is transmitted to wheel 28b and then to 28c by the usual mechanisms employed in wheel-type counter mechanisms to index wheel 28b one numeral for each revolution of wheel 28a and to index wheel 28c one numeral for each revolution of wheel 28b. The mechanism in this instance is arranged to rotate wheels 28b and 28c to indicate a particular week as identified by consecutive numbers.

The diameter of the wheels 28 is determined by the relative position of the shaft 33 to position the lowermost portion of their periphery at the horizontal plane defined by the lower end of the time dial 30.

Driving of the hour dial cylinder 32 is accomplished by an electric motor 36 connected by a gear train to a gear 37 fixed on shaft 38 extending upwardly from the cylinder 32. The speed of the motor 36 is reduced by a gear-reduction box 39 and a worm gear train 40 to rotate the hour dial cylinder 32 one complete revolution in twenty-hour hours.

The printing wheels 29 form a part of a commercially available type counter mechanism and have raised numerals formed on the periphery thereof. These wheels 29 are rotatably mounted on a shaft 41 axially aligned with the shaft 33, having one end journalled in bracket 14b. The other end of this shaft is journalled in a compartment member 14c and extends a distance outwardly thereform. Fixed to the end of this shaft is a lever arm 42 whereby pivotal movement of the lever 42 will index the wheels 29 to form consecutive numbers. The wheels 29 are also of a diameter to position the lowermost portion of their periphery at the horizontal plane defined by the lower end of the hour dial 30.

Mounted directly below the printing wheels and hour dial is a vertically reciprocal stamping plate 43. Movement of the plate upwardly will forcibly bring the ticket forms into contact with the printing wheels and hour dial to cause printing of the numbers. The stamping plate 43 is resiliently mounted on a supporting member 14d attached to the housing 14. Resilient mounting of the stamping plate 43 is accomplished by a plurality of springs 44 disposed within telescoping tube guide members 45. In the present embodiment, four spring and tube assemblies are utilized to force the stamping plate 43 upwardly. Extending laterally from each end of the stamping plate 43 is an arm 46 provided with a downwardly extending leg 47 at the outer end thereof. The arms 46 are rigidly secured to the ends of the plate 43 by rivets, for example, forming a unitary structure. The lower ends of the legs 47 are connected together by a transversely extending bar 52 for rigidity. Extending vertically along the central portion of each leg 47 is an elongated slot 48 for receiving a cylindrical guide pin 49. The guide pins 49 are supported a distance above the support plate 14d by a bracket 50 of U-form. The bottom of the bracket 50 is secured to the plate 14d with the side arms thereof angled upwardly and disposed externally of the legs 47 to provide adequate clearance for free movement of the stamping plate 43 and arms 46. Formed along a portion of the upper edge of each arm 46 is an outwardly turned flange 46a which terminates adjacent the side of the stamping plate 43 to provide a contacting surface.

In FIGS. 9 and 10, the stamping plate 43 is shown in its lowermost position with the springs 44 compressed. A cylindrical crank pin 51 fixed to the inner face of each of the gears 25 and 25a, extends a distance laterally therefrom to engage the flanges 46a and retain the stamping plate 43 in its lowermost position. Rotation of the gears 25 and 25a in a clockwise direction as viewed in FIG. 9 will cause the pins 51 to slide off their respective flanges 46a to permit the springs 44, which were previously compressed, to force the stamping plate 43 upwardly. The normally extended length of the springs 44 is such that the plate 43 will compress the ticket form 18 and record tape 20 against the printing wheels and hour dial. Utilization of pressure-sensitive paper for the ticket forms and record tape eliminates the necessity of supplying ink or the use of carbon paper and a permanent record will be formed on the ticket and record tape by pressure alone. Preferably, the springs 44 will maintain the stamping plate 43 adjacent the record tape 20 but will not compress the paper tightly against the printing wheels and dial and interfere with the longitudinal travel of the ticket and tape through the printing mechanism. A sufficient printing pressure is obtained through the inertia of the upwardly moving plate 43 which will extend the springs 44 slightly beyond their normal extended position before the plate 43 assumes its desired normal upper position.

Continued rotation of the gear 25 also brings the pin 51 attached thereto into engagement with the lever 42 for indexing the printing wheels 29 to the next consecutive number. The shaft 41 and lever 42 are biased by a spring member in the counter mechanism to return the lever to its normal position after the pin 51 is disengaged therefrom preparatory to the next printing and counting sequence.

Figure 5:
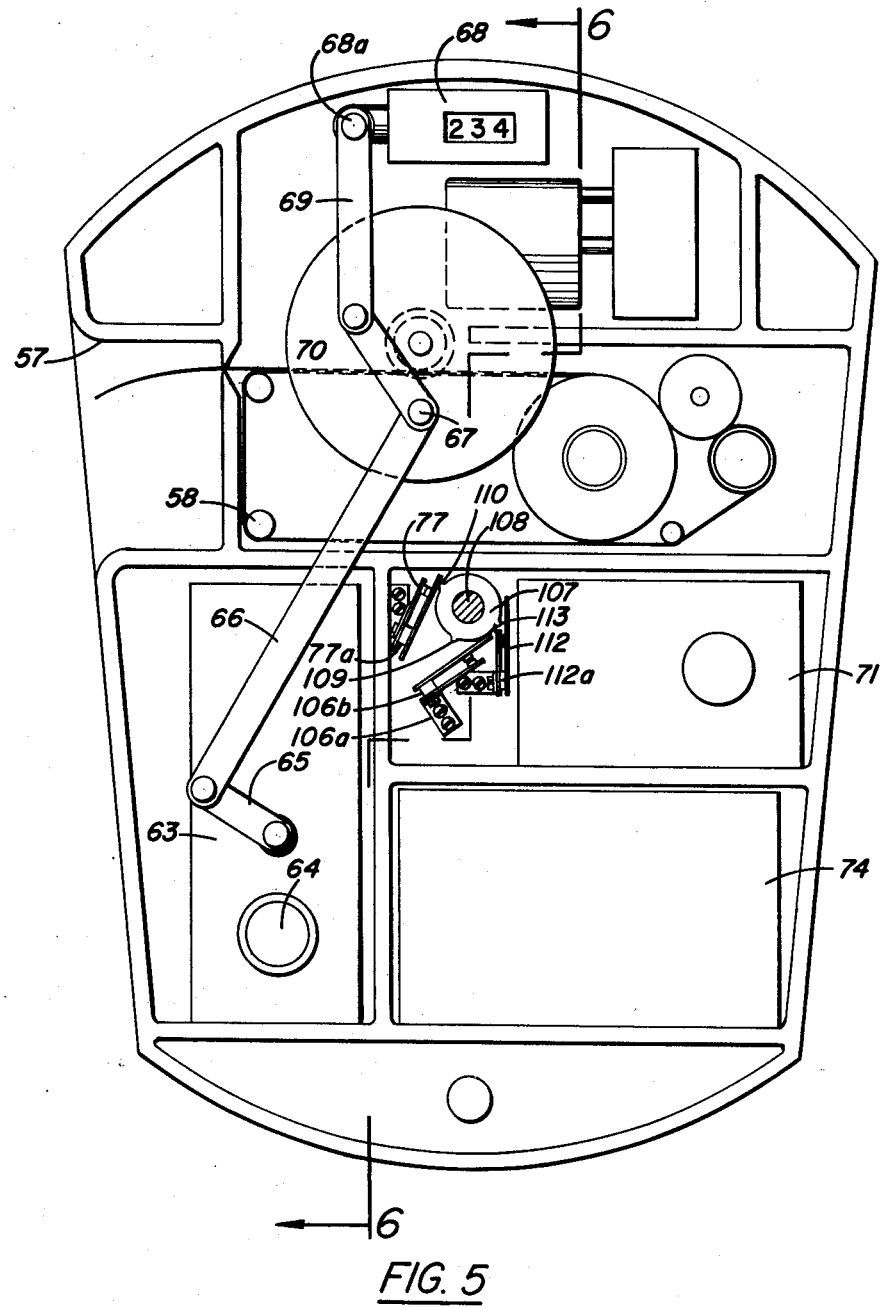
FIG. 5 is a front elevational view of the control unit with the cover removed.

The ticket magazine 17 is disposed in the housing compartment containing the printing mechanism 16 and is positioned at one side thereof. The ticket magazine 17, shown in detail by FIGS. 7 and 8, comprises a case having vertical side plates 53 in which a shaft 54 is journalled. Supported on the shaft 54 is a mandrel 55 on which the elongated web of the ticket forms 18 and the record tape 20 is wound. The roller 21 is also rotatably supported by the side plates 53. Rearwardly and spaced from the supply roll is the take-up spool 19. In operation, the associated ticket forms and record tape are drawn from the supply roll by the sprocket wheels 23 of the printing mechanism. After a printing operation, the ticket form is moved longitudinally through an elongated slot 56 formed in the wall member 14a into a recess 57 formed in the housing 14 (FIGS. 5 and 2). The record tape 20 is returned to the take-up spool 19 around the roller 22 positioned adjacent the wall member 14a of the housing 14 and the spaced rollers 58 and 58a. The roller 58 (see FIG. 5) is spaced vertically beneath roller 22 and is rotatably supported by the housing 14 to maintain the record tape 20 below the support plate 14d. The roller 58a is journalled in the side plates 53 of the ticket magazine in a horizontal plane with the roller 58. Rotary motion is transmitted to the take-up spool 19 by the supply roll through an idler roller 59 rotatably mounted on a shaft 60. The shaft 60 is disposed in an arcuate slot 61 formed in a mounting plate 53a secured to the side plates 53. The roller 59 is surfaced with a frictional material and is maintained in engagement with the periphery of the supply roll and the tape 20 on the take-up spool 19 by a pair of tension springs 62 connected to the shaft 60 and roller 58a at their ends. By appropriately positioning the slots 61, the rollers 59 will always be in engagement with the supply roll and tape on the take-up spool 19. Rotation of the supply roll is thereby transmitted to the take-up spool to wind up the record tape 20. Preferably, the ticket magazine 17 is removably mounted in the housing compartment to facilitate replacement of the supply roll and removal of the record tape 20 on the take-up spool 19.

The printing mechanism also operates a photographic camera 63 mounted in an adjacent compartment of the housing 14. The lens 64 of the camera extends through an opening in the housing cover 15 for photographing the license plates of vehicles which enter the parking space. Preferably, to simplify the operating mechanism of the control unit, the camera 63 is of the type having a single externally operated, actuating lever 65 which not only trips the shutter but also simultaneously advances a roll type photographic film and recocks the shutter. A lever arm 66, pivotally connected to the actuating lever 65 of the camera is also pivotally connected to a crank pin 67 fixed to the outer face of the gear 25. Rotation of the gear 25 will thereby pivot the lever 65 to actuate the camera 63.

Also operated by the printing mechanism is a consecutive number indicator 68 to provide a visual indication of the number of tickets issued by the control unit. The indicator 68 in the illustrated embodiment consists of a commercially available counter mechanism actuated by a rotatable shaft 68a connected thereto by a right angle drive. Rotation of the shaft 68a through a small angle indexes the counter to the next consecutive number. The indicator 68 is mounted in the upper portion of the housing 14 above the printing mechanism 16 and is actuated by a lever arm 69 fixed at one end to the shaft 68a. A connecting link 70 is pivotally connected to the opposite end of lever 69 and the pin 67 on the gear 25. The lengths of the lever 69 and link 70 are such that their longitudinal axes will not be aligned when the pin 67 has been revolved to its furthermost position from the shaft 68a. Rotation of the gear 25 will, therefore, always pivot lever 69 and shaft 68a. An opening 15b is formed in the cover 15 for external viewing of the counter.

Figure 20:
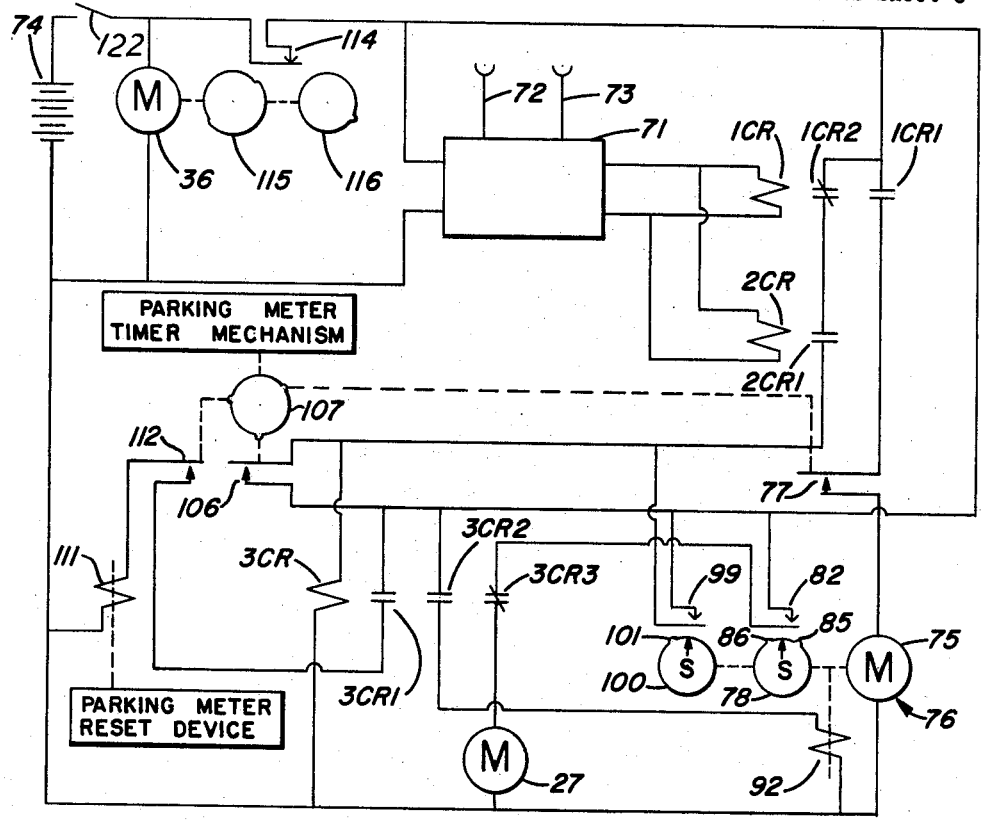
FIG. 20 is a schematic diagram of the electrical circuit of the control unit.

Operation of the control unit is initiated by a detector 71 responsive to the presence of a vehicle in the assigned parking space. In the present embodiment, the detector 71 comprises an ultrasonic energy device that produces a signal when a vehicle or other large metallic body enters its field. The ultrasonic detector presently utilized is a commercially available unit and is therefore not described in detail. It includes in general a transistorized circuit operatively connected to a radiating antenna 72 and a receiving antenna 73 and to a control circuit (FIG. 20). The antenna is enclosed within a protective housing 15c secured to the cover 15. The signal produced by the detector circuit controls a pair of relay coils 1CR and 2CR which, in turn, control the operation of the printing mechanism 16. Power for the operation of the ultrasonic detector 71 is supplied by a power source 74 consisting of batteries supported in a compartment in the housing 14.

Upon the entrance of a vehicle into a parking space, the detector 71 energizes the relay coils 1CR and 2CR. Relay coil 1CR, when energized, closes a normally open contact 1CR1 and opens a normally closed contact 1CR2. Contact 1CR1 is connected in series with the power supply 74 and a driving motor 75 of a control unit timing mechanism 76 for controlling the operation thereof. A normally closed contact 77 controlled by the timer mechanism of the parking meter 11 is also connected in series with contacts 1CR1 and the motor 75.

The timing mechanism 76 controls the operation of the printing mechanism 16 to provide accurately measured time intervals that determine the occurrence of parking violations which result from failure to deposit the necessary coins in the parking meter 11 for the operation thereof. The timing mechanism 76, therefore, operates when the parking meter 11 is inoperative in which state the parking meter timer mechanism is not actuated to provide a determination of a paid parking interval. As an example, the timing intervals that may be measured are three minutes after the entrance of a vehicle into the parking space and also sixty minutes after entrance of the vehicle. The purpose of the three-minute parking interval is to allow time for complete parking of the vehicle and insertion of a coin into the parking meter 11. The parking meter 11 controls the contact 77 which is opened to interrupt the operation of the timing mechanism and prevents actuation of the ticket printing mechanism when a coin has been deposited and the parking meter timer mechanism manually set.

If a coin is not inserted in the parking meter 11, contact 77 remains closed and the timer mechanism 76 will continue to operate and measure the three and sixty minute intervals. After the completion of each timed interval, either a three or sixty minute interval, a circuit is completed to the motor 27 of the printing mechanism. This circuit is of timed duration sufficient to permit the gears 25 to make one complete revolution which completes a ticket printing cycle.

Figure 6:
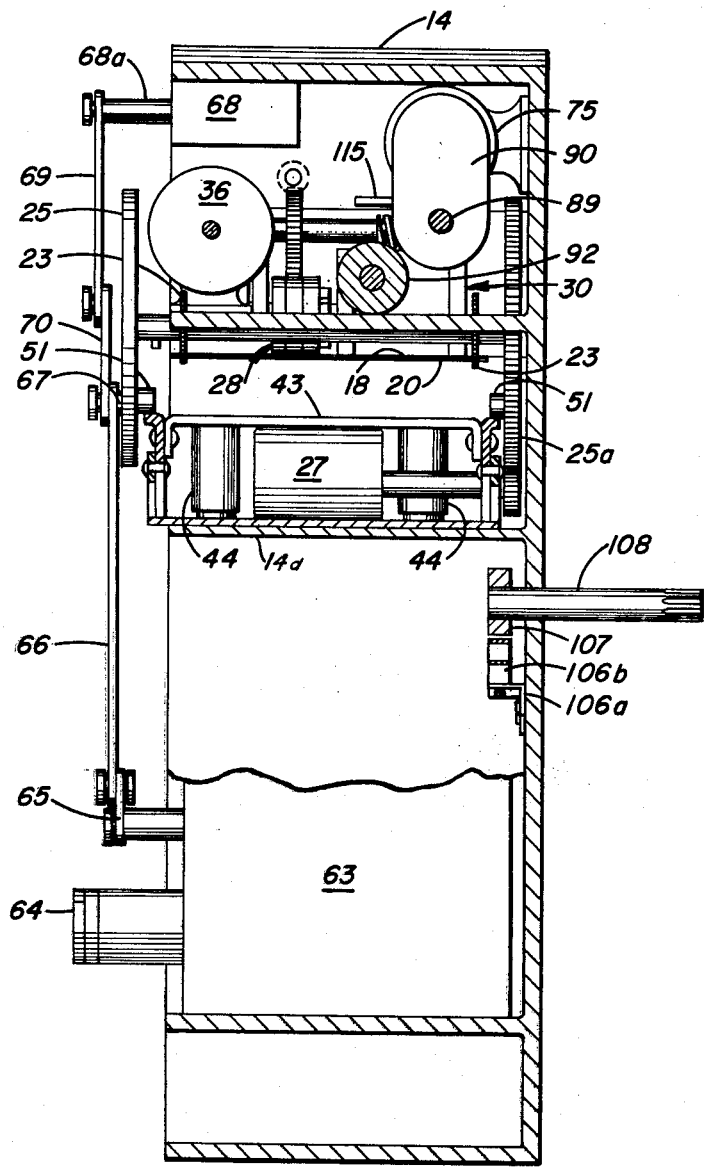
FIG. 6 is a sectional view of the control unit taken along line 6—6 of FIG. 5.

The timing mechanism 76 is mounted in the upper portion of the housing 14 as is best shown in FIG. 6 and the detailed views in FIGS. 13 through 19, inclusive. It includes the motor 75, which is secured to the housing 14 by a bracket, operatively connected to a timing cam 78 which is mounted on a rotatable shaft 79 journalled in frictionless bearings 80 and 81. The bearings 80 and 81 are supported by members of the housing 14. Actuated by the timing cam 78 is a normally open, leaf-type contact switch 82 (FIG. 15) secured to a wall member of the housing 14 by an insulating bracket 83. One leaf of the switch is provided with a cam follower 84 that is disposed in contacting engagement with the periphery of the timing cam 78. A three minute timing lobe 85 is formed on the periphery of the timing cam 78 at an angular displacement from an initial or starting position S of the cam such that the lobe 85 will engage the cam follower 84 and close switch 82 three minutes after the cam 78 has started to rotate. A sixty minute timing lobe 86 is also formed on the periphery of the cam 78 but is angularly displaced from the starting position S so that it will engage the cam follower 84 sixty minutes after the cam 78 has started to rotate. The switch 82 is connected in series with the power source 74 and the motor 27 of the printing mechanism 16. Closing of the switch 82 will, therefore, energize the motor 27 and thus enables the printing mechanism to complete a printing cycle. The cam lobes 85 and 86 are shaped to maintain the switch 82 closed for an interval of time necessary for the motor 27 to rotate the gears 25 and 25a through one revolution.

Once the timing interval has been initiated by the control unit 11, it becomes necessary to reset the timing cam 78 to its starting position S in three instances. These instances are when the vehicle has left the assigned parking space, when the timing cam 78 has completed a sixty-minute timing interval, or when a coin has been inserted in the parking meter 11. To perform the reset operation, the timing cam 78 is operatively connected to the motor 75 through a clutch assembly 87. This clutch assembly 87 includes a clutch plate 88 of cylindrical form slidably mounted on a rotatable shaft 89 extending from a gear-type speed reduction unit 90 which is driven by the motor 75. Although the clutch plate 88 may be moved axially on the shaft 89, it is fixed for rotation therewith by mating splines formed on the shaft 89 and in the bore of the clutch plate 88. Disengaging the clutch plate 88 from the timing cam 78 permits the cam to be rotated in a reverse direction to its starting position S. The force for rotating the timing cam 78 in a reverse direction is provided by a torsion spring 91 having one end connected to the shaft 79 and the other end secured to the housing 14 (FIG. 18). The spring 91 is arranged so that rotation of the shaft 79 and cam 78 in a forward or timing direction will increase its tension. Therefore, upon disengagement of the clutch 88 from timing cam 78, the spring 91 returns the cam to its starting position.

Disengagement of the clutch 88 is accomplished by an electrical solenoid 92 which has a movable armature 93 pivotally connected to a clutch lever 94. As shown in detail by FIGS. 14, 16 and 19, the clutch lever 94 comprises a rectangular plate pivotally mounted at one end on a bracket 14c integrally formed with the housing 14. A centrally disposed, substantially circular opening is formed in the lever 94 through which the clutch plate 88 extends. Portions of the opening are provided with a radial, inwardly extending rib 95 of rectangular cross section which engages a mating groove 88a formed in the outer periphery of the clutch 88. The rib 95 fits loosely in the groove 88a to permit the clutch 88 to rotate freely. Secured to the end face of the clutch plate 88 which is disposed adjacent to the cam 78 is a facing material 96 for increasing the frictional contact with the cam 78. The clutch 88 is continuously urged into engagement with the timing cam 78 by a compression type, clutch spring 97 mounted on the shaft 89. The spring 97 is partially disposed in an annular groove 88b formed in the other end face of the clutch 88 with the external portion in contacting engagement with a retaining collar 98 fixed on the shaft 89. Energization of the solenoid 92 will pull the armature 93 thereby pivoting the lever 94 to disengage the clutch 88 from the timing cam 78.

In the instance where the vehicle has left the parking space and the timing mechanism 76 must be reset, the detector 71 deenergizes relay coil 1CR which opens contacts 1CR1 and closes 1CR2. Relay coil 2CR is also simultaneously deenergized but the contacts 2CR1 controlled by relay coil 2CR remain closed for an interval of time and connect a reset relay coil 3CR to the power source. For this purpose, relay 2CR is of the time-delay opening type which may have a delay of approximately five seconds which is sufficient for completion of the reset operation. The coil 3CR of the reset relay, also of the time-delay opening type, controls the normally open contacts 3CR1 and 3CR2 and the normally closed contact 3CR3. Contact 3CR2 of the reset relay is connected in series with the power source 74 and the reset solenoid 92. Deenergization of the detector controlled relays 1CR and 2CR, which occurs when a vehicle leaves a parking space, will therefore energize the reset relay coil 3CR for an interval of time thus causing contacts 3CR2 to close and energize solenoid 92 permitting resetting of the timer mechanism. Assuming that the timing cam 78 has been rotated sufficiently to bring one or both of the lobes 85 and 86 into engagement with the cam follower 84, it becomes necessary to interrupt the circuit to the motor 27 of the printer mechanism. Interruption of this circuit prevents operation of the printer when the lobes of the timing cam 78 again actuate the switch 82 as the cam rotates in a reverse direction. For this purpose, the normally closed contact 3CR3 is also connected in series with the motor 27. Actuation of the reset relay will, therefore, simultaneously open contact 3CR3 to interrupt the circuit of motor 27 during the reset operation.

In the second instance where the timing cam 78 has completed one sixty-minute timing interval, it is necessary to reset the timing mechanism 76 to prevent overstressing of the spring 91 and permit initiation of a second complete timing interval should the vehicle continue to remain in the parking space. To accomplish this, a normally open contact switch 99 of the leaf spring type is connected in series with the power source and the reset relay coil 3CR. The switch 99 is actuated by a reset cam 100 also mounted on the shaft 79 for rotation with the timing cam 78. As shown best by FIG. 17, the reset cam 100 is also provided with a lobe 101 formed on the periphery thereof for engaging a cam follower 102 secured to one of the leaves of the switch 99 which is attached to a member of the housing 14 by a bracket 103. This lobe 101 is angularly displaced from the starting position S a distance such that rotation of cam 100 will bring the lobe 101 into engagement with cam follower 102 at a time subsequent to completion of a sixty-minute timing interval as determined by the timing cam 78. The reset operation, in this instance, is thereby initiated by the timing mechanism itself. Actuation of switch 99 connects the reset solenoid 92 to the power source 74 through the contacts 3CR2 to disengage the clutch 88.

To accurately stop the timing mechanism at its starting position S during a reset operation, an index pin 104 is provided. The pin 104 is secured to a wall member of the housing 14 and extends outwardly therefrom to engage a protruding lug 105 formed on the adjacent face of the cam 100 as shown in FIGS. 14 and 17.

In the third instance, the reset operation is initiated by manually setting the parking meter 11 after a coin has been inserted. This reset operation is desirable as a three-minute interval is provided at the expiration of a sixty-minute parking interval as timed by the parking meter 11 to permit removal of the vehicle or insertion of another coin. The manual setting of the meter 11 closes a normally open contact 106 connected in series with the power source and the reset relay coil 3CR. The contact 106 is supported by a bracket 106a on the housing 14 and is actuated by a cam 107 mounted on a shaft 108 (FIG. 5) which extends into the parking meter 11 and is operatively connected to the timer mechanism therein. Shaft 108 is rotated by the manual setting mechanism of the meter 11. Formed on the periphery of cam 107 is a lobe 109 which closes the contact 106 when the meter 11 is fully set. Upon closing of contact 106, a reset operation similar to that previously described will occur.

It will be noted that the contact switch 77 is also actuated by the cam 107. Switch 77 is supported in operative relationship with the cam 107 by a bracket 77a attached to the housing 14. A second lobe 110 formed on the periphery of the cam 107 is positioned thereon to close contact 77 when the parking meter indicator is at zero.

It is desirable that the parking meter 11 be provided wth a reset device which will cancel any time remaining on any paid parking interval should a vehicle leave before the expiration thereof. Parking meters with such reset devices are commercially available and this device is, therefore, not described in detail. The reset device, however, is generally actuated by a solenoid. For this reason, a solenoid 111 controlled by the reset relay 3CR is also provided; however, it is to be understood, that the solenoid 111 is installed in the parking meter 11. The coil of the solenoid 111 is connected in series with the contact 3CR1 of the reset relay for actuating the parking meter reset device simultaneously with the timing mechanism reset operation. Operation of the reset device of the meter 11 is undesirable when the reset operation for the timing mechanism 76 is initiated by setting of the meter 11. Its operation at this time would prevent the meter 11 from indicating any unexpired time. A leaf spring type contact switch 112 supported on the housing 14 by a bracket 112a and also actuated by cam 107 is, therefore, connected in series with solenoid 111 and contacts 3CR1. Contacts 101 are normally closed and are opened by a third lobe 113 formed on the periphery of the cam 107. The lobe 113 is so positioned on the cam 107 relative to switch 112 that it will open its contacts slightly before lobe 109 closes contacts 106. Operation of the reset device is thereby prevented as its actuating solenoid 111 will be disconnetced from the reset circuit.

Operation of the control unit is usually only necessary during certain prescribed times. These times are generally during the daylight hours from 6 a.m. to 6 p.m. exclusive of Sunday. A time-controlled power switch contact 114 is, therefore, connected in series with the power supply 74 and the remainder of the control circuit. The switch 114 not only conserves the power source 74 but prevents the operation of the control unit during the times when payment is not required for parking. The switch 114 is actuated by the motor driven cams 115 and 116. Cam 115 is fixed to shaft 38 of the hour dial 30 for rotation therewith. Since the hour dial completes one revolution every twenty-four hours, cam 115 is provided with a lobe 115a formed on approximately one-half of its periphery. One of the contacts of switch 114 is mounted on a pivoted lever arm 117. The arm 117 is fixed on a rotatable shaft 118 journalled in the bracket of the hour dial 30 and the bracket 14b. Shaft 118 extends inwardly through the bracket of the hour dial 30 and has a lever-type cam follower 119 fixed to the end thereof. The cam follower 119 and contact lever 117 are relatively fixed to the shaft 118 so that when the cam follower 119 engages the lobe 115a on cam 115, contact 114 will be opened. A leaf spring 120 (FIG. 11) secured to the housing member 14a biases the cam follower 119 to maintain switch 114 closed. Cam 115 is continuously rotated by the motor 36 and will, therefore, disconnect the detector 71 and other components of the circuit from the power source during the times as determined by the cam lobe.

It is also desirable that the control circuit be disconnected from the power source during Sundays when parking does not generally require payment. To actuate the switch 114 and maintain the contacts open during an entire day, such as Sunday, the cam 116 is mounted on the shaft 33 for rotation therewith. Cam 116 is provided with a lobe 116a which engages a lever arm 121 integrally formed with the switch lever 117. Switch 114 is thereby actuated for a twenty-four hour period for every complete revolution of the shaft 33. Shaft 33 makes a complete revolution once every seven days as previously described.

A manually operated disconnect switch 122 is connected in series with the power source 74 and the motor 36 and the switch contacts 114. This switch permits disconnecting of all the electrically operated components of the control unit at any time it is desired to render the control unit inoperative without affecting the normal operation of the parking meter 11.

Figure 3:
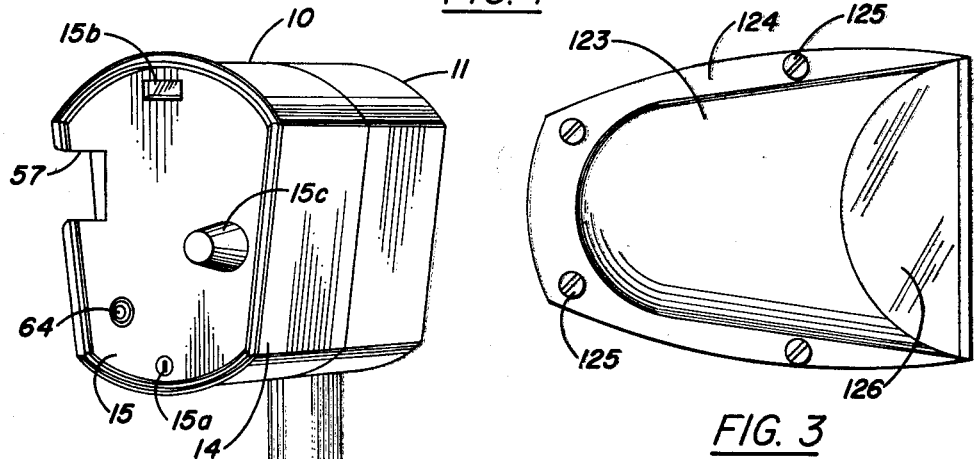
FIG. 3 is a top plan view of a camera reflector.
Figure 4:
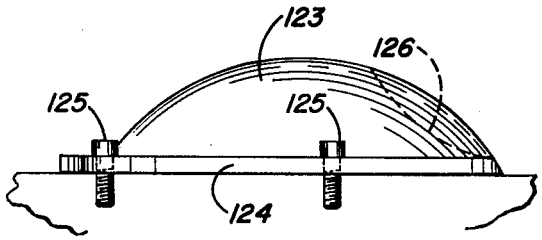
FIG. 4 is a side elevational view of the reflector.

In FIG. 1, the relative position of the parking meter 11 with a control unit 10 attached thereto to an assigned parking space A is illustrated with the apparatus disposed adjacent a pavement curb 13 near one end of the parking space A. As indicated by the dashed lines, this location permits the photographing of the license plate B of a vehicle C located in the parking space A by the camera 63 mounted within the control unit 10. A reflector 123 secured to the pavement a distance forwardly of the parking space provides a direct view of the license plate B. FIGS. 3 and 4 illustrate the reflector 123 in detail which is fabricated of metal having a peripheral flange 124 through which a plurality of screws 125 extend to secure the reflector to the pavement. Integrally formed in one end of the reflector is a polished metal reflecting surface 126. This reflecting surface is preferably of convex form disposed at an angle to the pavement to accurately project an image of the license plate B upwardly to the camera lens 64 in the control unit 10. This arrangement is particularly advantageous in that it permits attachment of a control unit of this invention to existing parking meters which are positioned near one end of a parking space. However, it is also contemplated that the parking meter and control unit may be positioned forwardly of the parking space along the curb and, by use of a wide angle camera lens, permit direct photographing of the license plate. This method of installation would be preferred on new installations as it would eliminate the necessity of providing a reflector.

The operation of the control unit will be described hereinafter based on the assumption that the power switch 114 is closed. Operation of the switch 114 itself and its function has been previously discussed.

The master time clock motor 36 operates continuously causing the hour dial 30 to indicate the hour or the fractional part thereof and the printing wheels 28 to indicate the day of the week and the specific week of the year. Identification of the weeks by numerals eliminates the difficulties encountered in using the names of the months. This difficulty results from the variations in lengths of the several months and the variations in the day of the week on which they start and terminate. The arrow on the rotatable cylinder 32 of the hour dial continuously indicates the hour of the day as it revolves in cooperation with the hour numerals formed on the annular end of the dial housing 31 and, therefore, will print the correct hour during which a parking violation may be incurred. After each revolution of the hour dial, the printing wheel disc 28a is indexed one-seventh of a revolution to position the appropriate numeral in a printing position at the horizontal plane defined by the lower end of the hour dial 30. Each of the printing wheel discs 28b and 28c are similarly indexed to form the numeral which indicates the appropriate week that is also printed.

For accurate identification of the vehicle which incurred a parking violation with the ticket issued therefor, it is preferable that the photographic film have each frame thereof consecutively numbered. The printing wheels 29 forming a part of the consecutive number counter are accordingly set to print a consecutive number on the ticket form corresponding to the number of associated film frame.

The detector unit 71 also operates continuously during the prescribed hours. When a vehicle enters the assigned parking space, the detector energizes the relay coils 1CR and 2CR closing contact 1CR1 to complete a circuit from the power source 74 to the motor 75 of the timing mechanism 76 through the switch contact 77 controlled by the parking meter 11. The timing cam 78 is thereby rotated to measure the three minute and sixty minute intervals. If a coin is deposited in the parking meter 11 and the indicator thereof is manually set, the switch contact 77 controlled thereby is opened and interrupts the circuit to the time motor 75 stopping the timing interval measured by the control unit. Simultaneously with setting of the parking meter, the indicator mechanism momentarily closes the switch contacts 106 to connect the reset relay coil 3CR to the power source 74. The normally open contact 3CR2 controlled thereby is closed to energize the solenoid 92 of the timing mechanism reset mechanism. Solenoid 92 disengages the clutch 88 from the timing cam permitting the torsion spring 91 to return the timing cam 78 to its starting position. The reset relay including coil 3CR is of the time delay opening type and maintains contact 3CR2 closed for an interval of time sufficient to permit resetting of the timing mechanism 76. The normally closed contact 3CR3 controlled by the reset relay is opened during the reset operation to interrupt the circuit to the motor 27 of the printing mechanism 16 regardless of the actuation of the switch 82 by the timing cam. During the setting of the meter mechanism, the circuit to the solenoid 111 of the reset device is interrupted by contact switch 112 although contact 3CR1 of the reset relay is closed. The switch 112 is opened before switch 106 is closed and will, therefore, not close until an interval of time has elapsed after setting of the parking meter 11. This interval of time is greater than the delay time of the reset relay coil 3CR thus preventing actuation of the reset device. The parking meter 11 is then effective in measuring a paid parking interval. After the expiration of the paid parking interval, the meter mechanism closes the switch contacts 77 and again sets the timing mechanism 76 in operation.

If a coin is not deposited in the parking meter 11 within three minutes after the expiration of a paid parking interval or after a vehicle enters the parking space, the timing mechanism controlled switch 82 is closed by the lobe 85 of the timing cam 78 thus completing a circuit to the motor 27 of the printer mechanism 16. The motor 27 drives the gears 25 and 25a which operate the printing mechanism 16 and the camera 63. At the start of the printing cycle, the stamping plate 43 is released, forcing the ticket form 18 and record tape 20 into contact with the printing wheels 28 and 29 and the hour dial 30 which print the necessary information on the ticket and record tape. Simultaneously, the sprocket gears 23 propel the ticket form through the printing mechanism 16 and eject it into the recess 57 through the slot 56 where it may be readily torn off by the driver of the vehicle. As the gear 25 continues to revolve, the camera 63 is actuated to photograph the license plate of the vehicle, the consecutive number printing wheels 29 are indexed to the next consecutive number, and the visual consecutive number indicator 68 is indexed to indicate the number of tickets that have been issued. Also, as the gears 25 and 25a revolve to their starting position, the pins 51 secured thereto engage the flanges 46a to return the stamping plate 43 to its lowermost position by compressing the springs 44. This completes a ticket printing cycle.

Another printing cycle is similarly completed when the sixty minute timing lobe 86 closes the switch contact 82. After completion of the sixty minute cycle, however, the reset cam 100 closes the associated switch contact 99 to energize the coil 3CR of the reset relay to reset the timing mechanism 76. The reset operation in this instance is similar to that previously described except that the solenoid 111 of the meter reset device is also energized since switch contact 112 remains closed. The control unit 10 will thereafter continue to time the unpaid parking intervals until the vehicle is removed from the parking space.

Whenever the vehicle is removed from the parking space, the detector unit 71 disconnects the relay coils 1CR and 2CR from the power source. Contact 1CR1 will open and contact 1CR2 will close. Since the relay coil 2CR is of the time delay opening type, contact 2CR1 will remain closed for an interval of time and connect the reset relay coil 3CR to the power source 74. The timing mechanism 76 is thus reset whenever the vehicle leaves the parking space. Simultaneously, the solenoid 111 of the meter reset device is energized to cancel any time which may remain from a paid parking interval.

In summary, the operation of the control unit is completely automatic and eliminates the necessity of supervising the parking facilities. The detector unit controls the operation of the several mechanisms of the control unit which time the parking intervals that are not paid for and issue tickets for the violations incurred. It is an entirely self-contained unit requiring only minor modifications of the existing parking meters for attachment thereto. This consists pirmarily of connecting a cam shaft to the timer mechanism of the parking meter. Similarly, the reset device of the parking meter need only be electrically connected to the circuit of the control unit for its operation. Not only is a ticket issued for each parking violation but a duplicate record is made which is retained by the control unit for checking at a more convenient time. The violating vehicle is adequately identified by the photograph of the license plate should legal prosecution for payment be required at a subsequent time for enforcement of the parking regulations. The only maintenance required is an occasional inspection to assure that the ticket magazine and camera film supply are not exhausted. This inspection is facilitated by the consecutive number counter visible through a window in the cover of the unit indicating the number of tickets which have been issued.

According to the provisions of the patent statutes, the principles of this invention have been explained and have been illustrated and described in what is now considered to represent the best embodiment. However, it is to be understood that, within the scope of the appended claims, the invention may be practiced otherwise than as specifically illustrated and described.

Having thus described this invention, what is claimed is:

1. An automatic control unit for a parking meter comprising an electrical power source, a detector operatively sensitive to the presence of a vehicle in a parking space assigned to said meter and connected to said power source, a ticket issuing mechanism for providing a record of parking time violations that may be incurred by a vehicle in said parking space, and an electrically-actuated timing mechanism for measuring time intervals that determine parking time violations to connect said ticket issuing mechanism to said power source for the actuation thereof, said timing mechanism being connectable to said power source by said detector.

2. An automatic control unit according to claim 1 including means for identifying the vehicle incurring the parking violation and for providing a record thereof, said means being connected to said ticket-issuing mechanism for operation therewith.

3. An automatic control unit according to claim 2 wherein said identifying means comprises a photographic camera for forming on a photo-sensitive film an image of an identifying indicia associated with said vehicle.

4. An automatic control unit according to claim 3 wherein said camera receives a reflected image of said vehicle identifying indicia from a reflecting means, said reflecting means being disposed a distance forwardly of said parking space.

5. An automatic control unit for a parking meter comprising an electrical power source, a detector operatively sensitive to the presence of a vehicle in a parking space assigned to said meter and connected to said power source, a ticket-issuing mechanism for providing a record of parking time violations that may be incurred by a vehicle in said parking space, said ticket mechanism including means for issuance of a ticket form for said vehicle and providing a duplicate record thereof, means for printing on said ticket form information identifying the parking violation incurred, and means for identifying the vehicle incurring the parking violation, and a timing mechanism for measuring time intervals that determine parking time violations to connect said ticket mechanism to said power source for the actuation thereof, said timing mechanism being connected to said power source by said detector.

6. An automatic control unit according to claim 5 wherein said ticket-issuing mechanism includes a roller supported in contacting engagement with an elongated web of ticket forms, said web of ticket forms having an elongated record retaining web disposed adjacent thereto and engaged by said roller, means responsive to said timing mechanism for imparting a rotative motion to said roller to propel said ticket forms and record web through said ticket-issuing mechanism, means for storing and for supplying said ticket forms and record web to said ticket-issuing mechanism, and means for taking up and storing said record web after passage thereof through said ticket-issuing mechanism.

7. An automatic control unit attachable to a parking meter which includes a timer mechanism selectively operable to measure a time interval comprising an electrical power source, an electrically-actuated ticket-issuing mechanism including means for providing an identified record of parking time violations incurred by a vehicle in a parking space assigned to the parking meter and vehicle identification means automatically operable in cooperation with said ticket-issuing mechanism for producing vehicle identification data correlated with said identified ticket record, an electrically-actuated timing mechanism selectively operable to determine a time interval for a parking time violation and having a set of normally open timing contacts responsive thereto, said timing contacts being connected in circuit with said ticket-issuing mechanism for the connection thereof to said power source on closing of said timing contacts, a detector operatively sensitive to the presence of a vehicle in the assigned parking space and including a set of normally open contacts electrically connected in circuit with said timing mechanism for connecting said timnig mechanism to said power source, a set of normally closed contacts mechanically coupled to the parking meter timer mechanism and electrically connected in series with said electrically-actuated timing mechanism with said last-named contacts being maintained in an open position during measurement of a time interval by the parking meter timer mechanism to prevent operation of said electrically-actuated timing mechanism, and a time-controlled power switch connected in series with said power source and operable to connect and disconnect said power source from the electrically-actuated components of the control unit.

8. An automatic control unit attachable to a parking meter which includes a timer mechanism selectively operable to measure a time interval comprising an electrical power source, an electrically-actuated ticket-issuing mechanism to provide notification of incurrence of parking time violations by a vehicle parked in an assigned parking space and including means for providing a record of each notification of a violation which is identifiable with the vehicle incurring the violation, an electrically-actuated timing mechanism connectable to said power source and having means for selectively connecting said ticket-issuing mechanism to said power source in accordance with predetermined time intervals, a detector responsive to the presence of a vehicle in the assigned parking space including contact means connected in circuit with said timing mechanism for selectively connecting said timing mechanism to said power source, and circuit means responsive to the parking meter timer mechanism and connected in circuit with said electrically-actuated timing mechanism to prevent the operation thereof when the parking meter timer mechanism is operating to measure a time interval.

9. An automatic control unit according to claim 8 wherein said electrically actuated timing mechanism incudes a set of contacts connected in series with said ticket-issuing mechanism and operable to connect said ticket-issuing mechanism to said power source, cam means mechanically connected to said last-named set of contacts and operable to cause the closing thereof, and an electric motor connected to said cam means for driving said cam at a predetermined rate whereby said last-named set of contacts will be closed at selected time intervals.

10. An automatic control unit according to claim 8 wherein said electrically-actuated ticket-issuing mechanism includes ticket tape and a record tape supply means, printing means for printing predetermined data on said tapes including identifying indicia, photosensitive means for recording identifying characteristics of a vehicle parked in the parking space and correlated with the identifying indicia of said ticket and record tapes, and electrically operated drive means for actuating said printing means, effecting predetermined linear movement of said tapes and operating said photosensitive means.

11. An automatic control unit attachable to a parking meter having a timer mechanism provided with a reset device and comprising an electrical power source, an electrically-actuated ticket-issuing mechanism for providing notification and a record of parking time violations incurred by a vehicle in an assigned parking space, an electrically-actuated timing mechanism connectable to said power source and having means for selectively connecting said ticket-issuing mechanism to said power source in accordance with preedtermined time intervals, said timing mechanism including means for resetting after expiration of the predetermined time intervals, a detector operatively responsive to the presence of a vehicle in the assigned parking space and including a set of contacts connected in circuit with said timing mechanism and said power source, said detector being operable to close said contacts on entrance of a vehicle to the assigned parking space for initiating operation of said timing mechanism and to open said contacts on exit of a vehicle from the parking space to discontinue operation of said timing mechanism, and means for actuating the reset device of the parking meter on exit of a vehicle from the parking space whereby the parking meter will not be left with unexpired time.

12. An automatic control unit according to claim 11 wherein said means for actuating the reset device of the parking meter includes an electromagnetic solenoid coupled to the reset device for the actuation theerof, and an electric circuit for selectively connecting said solenoid to said power source, said circuit including contact means controlled by said detector and operable to complete a circuit to said solenoid on exit of a vehicle.

(References on following page)

References Cited in the file of this patent

UNITED STATES PATENTS

| | | |
|---|---|---|
| 1,973,275 | Babson | Sept. 11, 1934 |
| 2,068,121 | Babson | Jan. 19, 1937 |
| 2,088,683 | Babson | Aug. 3, 1937 |
| 2,213,240 | Clausen | Sept. 3, 1940 |
| 2,214,829 | Bullock | Sept. 17, 1940 |
| 2,652,551 | Gumpertz et al. | Sept. 13, 1953 |
| 2,699,100 | Simjian | Jan. 11, 1955 |
| 2,769,165 | Bower | Oct. 30, 1956 |
| 2,821,283 | Cruse | Jan. 28, 1958 |
| 3,030,169 | Lohmeyer | Apr. 17, 1962 |
| 3,051,953 | Shepard | Aug. 28, 1962 |